July 12, 1955 U. G. HALE 2,712,708
FLY SWATTER
Filed March 13, 1953
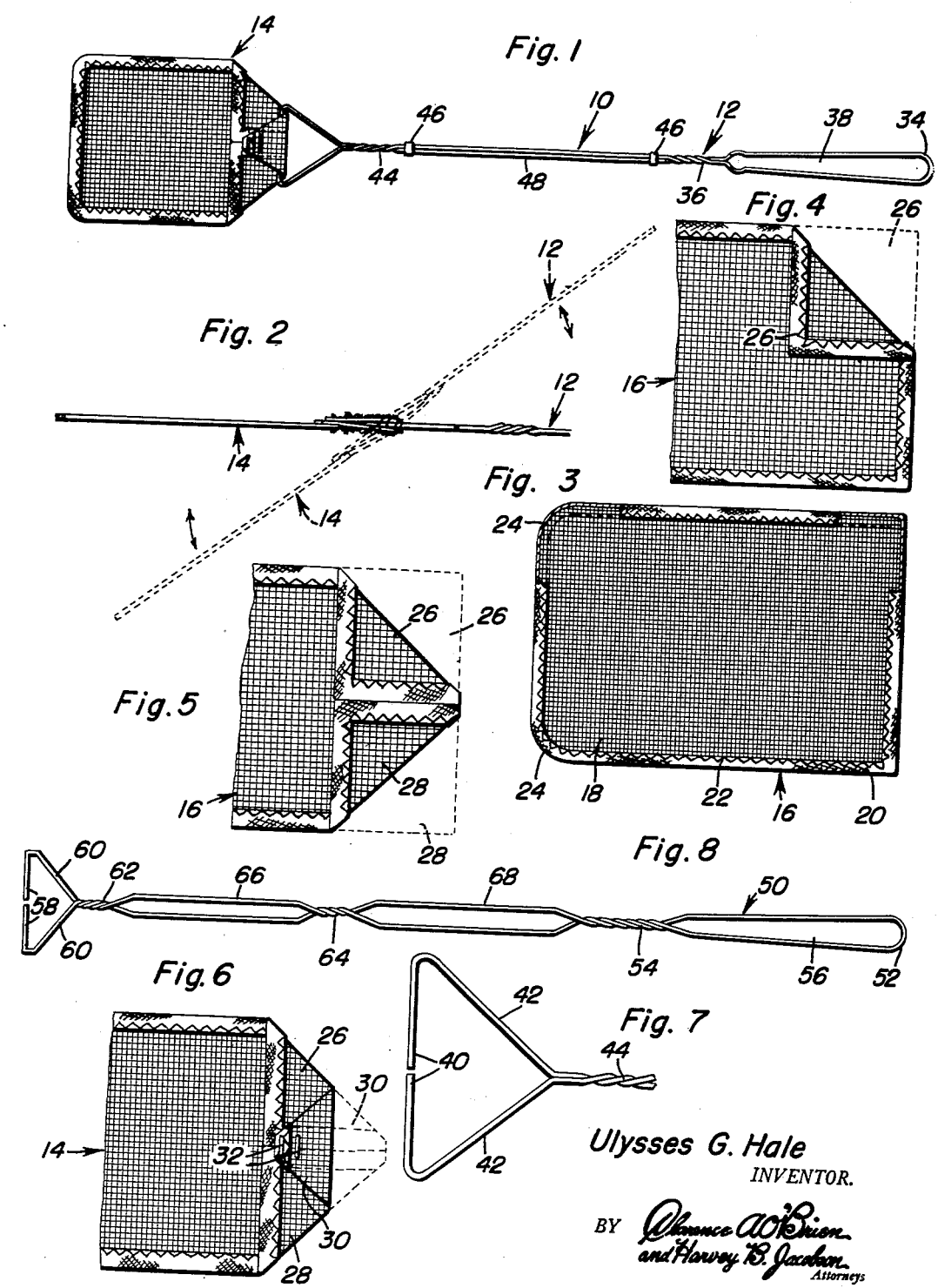
Ulysses G. Hale
INVENTOR.

United States Patent Office 2,712,708
Patented July 12, 1955

2,712,708
FLY SWATTER
Ulysses G. Hale, Brownwood, Tex.
Application March 13, 1953, Serial No. 342,131
1 Claim. (Cl. 43—137)

This invention relates in general to improvements in fly swatter constructions, and more specifically to an improved fly swatter of the hinging type.

There have been devised fly swatters in which the striker sheets are hingedly connected to their respective handles so that flies and other insects may be effectively struck. While these fly swatters have proved highly successful in operation, they are not widely used inasmuch as the connection between the striking sheet and its handle heretofore has not been strong with the result that the two soon become separated and it is necessary for the user to purchase a new fly swatter.

It is therefore the primary object of this invention to provide an improved connection between the striker sheet and handle of a fly swatter of the hinged type whereby the turning and twisting of the striker sheet is reduced to a minimum when the fly swatter is being utilized.

Another object of this invention is to provide an improved fly swatter of the hinging type which is of an extremely simple construction and readily assembled from conventional materials so as to be economically feasible.

A further object of this invention is to provide an improved method of folding an end of a striker sheet whereby an associated handle may be hingedly connected thereto through a minimum of effort.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a top plan view of an improved fly swatter of the hinge type conforming to the spirit of this invention;

Figure 2 is an enlarged fragmentary side elevational view of the striker sheet portion of the fly swatter of Figure 1 and shows its relationship to the forward end of the handle, various positions of the striker sheet and handle being shown in dotted lines;

Figure 3 is an enlarged plan view of the shape of a blank utilized in the forming of the striker sheet of the fly swatter of Figure 1, portions of the blank being broken away and shown in section in order to clearly illustrate the outline of the screen sheet utilized;

Figure 4 is a fragmenetary plan view of the blank of Figure 3 after one corner thereof has been bent inwardly as a first step in forming a connection between the striker sheet and its handle;

Figure 5 is a fragmentary plan view similar to Figure 4 and shows the blank after a second corner thereof has been folded inwardly to form a generally triangular end portion;

Figure 6 is a fragmentary plan view showing the handle receiving end of the striker sheet as it appears after the final fold;

Figure 7 is an enlarged fragmentary plan view of the striker sheet end of the handle of the fly swatter of Figure 1; and Figure 8 is an enlarged plan view of a modified form of handle which may be utilized with the striker sheet of Figure 6.

Referring now to the drawings in detail, it will be seen that there is illustrated in Figure 1 a fly swatter conforming to the spirit of this invention, the fly swatter being referred to in general by the reference numeral 10. The fly swatter 10 includes a handle 12 which has hingedly connected thereto a striker sheet 14.

Referring now to Figures 3 through 6, inclusive, it will be seen that there is illustrated the manner in which a blank, which is referred to in general by the reference numeral 16, is folded to form the striker sheet 14. It will be noted that the blank 16 includes a sheet of screen or other mesh 18 which has secured to the periphery thereof a border 20, the border being preferably formed of a cloth material and secured to the screen 18 by stitching 22. If desired, outer corners of the blank 16 may be rounded as at 24.

Referring now to Figure 4 in particular, it will be seen that a first corner 26 of the blank 16 has been folded inwardly along a substantially a 45° line extending from the center of one end of the blank. After the corner 26 has been folded inwardly, the adjacent corner 28 is folded inwardly in the manner best illustrated in Figure 5. It will be noted that when so folded the adjacent edges of the corners 26 and 28 are in abutting relation.

After the corners 26 and 28 have been folded inwardly, it will be noted that the handle end of the blank 16 is now generally triangular in outline. By folding this end portion of the blank 16 upon itself in the manner best illustrated in Figure 6, it will be seen that the striker sheet 14 is completed. It will be understood that the reversely bent end portion of the blank 16 will be referred to as a tab 30. The tab 30 is secured to underlying portions of the corners 26 and 28 and underlying portions of the main body portion of the blank 16 by suitable fasteners 32.

Referring now to Figures 1 and 7 in particular, it will be seen that the handle 12 is formed of a single length of wire which is reversely bent on itself as at 34. Adjacent portions of the handle 12 then extend in spaced relation and are twisted together as at 36 whereas to form a grip portion 38.

The free ends 40 of the wire forming the handle 12 are in aligned opposed relation and terminate in rearwardly and inwardly directed portions 42 which are connected together by a twisted portion 44. Disposed adjacent the twisted portion 44 and the twisted portion 36 are clips 46 which prevent twisting of the wire forming the handle 12. The portions of the wire between the clips 46 are straight as at 48.

In the manufacture of the fly swatter 10, the ends 40 are positioned over the corners 26 and 28 prior to the reverse folding of the tab 30. When the tab 30 is folded the ends 40 are disposed at the point of fold and retained within the confines of the striker sheet 14 by the fasteners 32.

Due to the particular manner in which the striker sheet 14 is formed from the blank 16 those portions of the striker sheet engaging the ends 40 of the handle 12 are reinforced due to their doubling. Because of this construction the life of the fly swatter 10 is greatly extended inasmuch as the hinging of the striker sheet 14 relative to the handle 12 does not cause excessive wear on these reinforced portions of the striker sheet.

As is best illustrated in Figure 2, the striker sheet 14 may be swung either upwardly or downwardly and will flushly engage a surface regardless of the angle of the handle 12 relative to that surface. Because of this particular relationship between the striker sheet 14 and its associated handle 12, the striker sheet engages a greater surface with the resultant increase in insect killing ability of the fly swatter 10.

Referring now to Figure 8 in particular, it will be seen that there is illustrated a modified form of handle which is referred to in general by the reference numeral 50. The handle 50, like the handle 12, is formed of a single length of wire which is reversely bent at its center as at 52. Adjacent portions of the handle 50 then extend in spaced relation and are twisted together as at 54 whereby a grip portion 56 is formed at one end of the handle 50.

The free ends of the wire are in opposed aligned relation at the opposite end of the handle 50, the ends being referred to by the reference numeral 58. The ends 58 terminate in rearwardly and inwardly directed portions 60 which are connected together by twisting as at 62.

In order that the handle 50 may be reinforced to resist bending upon the striking of an object with the striker sheet 14, the same is twisted intermediate its ends as at 64. This forms a forward portion 66 and an intermediate portion 68 in which the portions of the wire forming the handle are in spaced parallel relation. By spacing the portions of the wire greater stiffness is imparted to the handle.

It will be understood that the striker sheet 14 may be formed of any kind of screen wire, cellophane, nylon, perforated rubber or leather, or any other flexible material of a suitable nature. Also, if desired, certain slogans or advertising matter may be imprinted on the faces of the striker sheet.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claim.

What is claimed as new is as follows:

A fly swatter comprising: a wire handle including a substantially triangular end portion and a substantially rectangular flexible striker sheet mounted for swinging movement on said handle, said striker sheet comprising rear corner portions folded inwardly on diagonal, rearwardly convergent lines providing a reinforced end portion of double thickness and having parallel, abutting, longitudinally extending edge portions, said reinforced end portion being folded transversely on itself through said triangular end portion of the handle and overlying and bridging said corner portions, and fasteners inserted through the folded portion of said reinforced end portion, through the adjacent marginal portions of said corner portions and through said sheet for securing the assembly.

References Cited in the file of this patent

UNITED STATES PATENTS

| | | |
|---|---|---|
| 1,315,186 | Henry | Sept. 2, 1919 |
| 1,361,337 | Kelso | Dec. 7, 1920 |
| 1,369,757 | Cash | Feb. 22, 1921 |
| 1,380,355 | Cash | June 7, 1921 |
| 1,444,720 | Younger | Feb. 6, 1923 |
| 1,456,753 | Ancker et al. | May 29, 1923 |
| 1,578,757 | Rairden | Mar. 30, 1926 |